April 5 1932.    N. A. CARLSON    1,853,014
AUTOMOBILE FILLING STAND CONNECTION
Filed Aug. 25, 1930

Nelson A. Carlson
INVENTOR.

BY T. C. Lord
ATTORNEYS.

Patented Apr. 5, 1932

1,853,014

UNITED STATES PATENT OFFICE

NELSON A. CARLSON, OF ERIE, PENNSYLVANIA, ASSIGNOR TO ERIE METER SYSTEMS, INC., OF ERIE, PENNSYLVANIA, A CORPORATION OF PENNSYLVANIA

AUTOMOBILE FILLING STAND CONNECTION

Application filed August 25, 1930. Serial No. 477,546.

The ordinary automobile filling stand involves a metering case with a discharge connection near the top of the stand and a hose leading from this discharge connection which may be used in directing the flow of gasoline to the supply tank of the automobile. In order to provide a convenient and easy manipulation of the hose it is ordinarily formed with an exterior covering of textile fabric. This has a slight sheeting of rubber at the interior of the fabric and within the rubber is a flexible metal tube. This makes the hose as flexible as the service conditions will permit. In order to give the hose sufficient range of movement, it is desirable to make it of a length which in ordinary use involves the engagement of the lowest portion of the hose with the ground, or concrete with which the ordinary station is provided. The textile covering is readily injured by the abrasive action of the concrete or ground in the ordinary use of the hose. In the present invention this difficulty is obviated by providing the hose along that part which in use engages the ground with a rubber coat, or armor outside the fabric. This rubber coating very materially stiffens up this part of the hose, but with the full flexibility of the ends the hose can be readily manipulated in use and the rubber armor protects the part that is subjected to the severe wear. Features and details of the invention will appear from the specification and claims.

A preferred embodiment of the invention is illustrated in the accompanying drawings as follows:—

Figure 1:
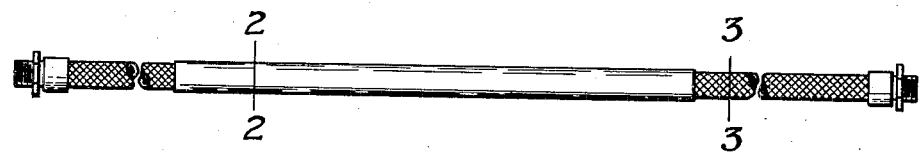
Figure 2:
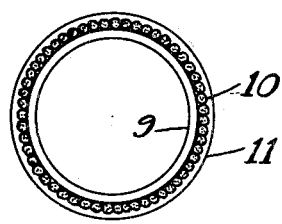
Figure 3:
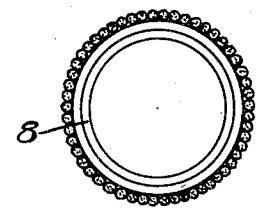
Figure 4:
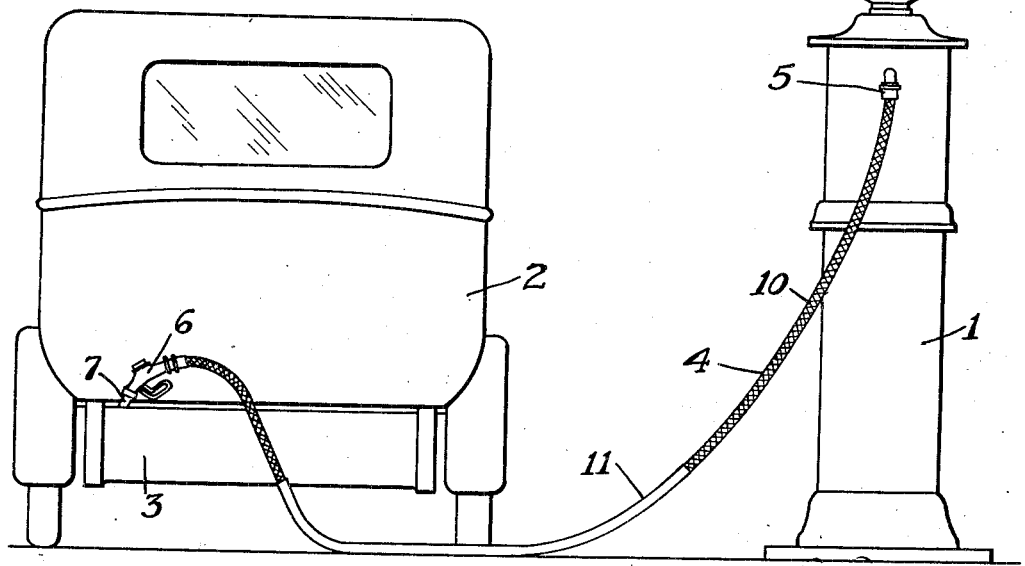

Fig. 1 shows an elevation of the hose.
Fig. 2 a section on the line 2—2 in Fig. 1.
Fig. 3 a section on the line 3—3 in Fig. 1.
Fig. 4 a view of a stand showing the hose in use.

1 marks the filling stand, and 2 an automobile having its supply tank 3 in position to receive gasoline. A hose 4 leads from a connection 5 at the upper part of the stand 1 and is provided with an operating valve 6 and a nozzle 7 at its oposite end.

The hose 4 at the end parts has a flexible metal tube 8, a rubber seat 9, and a fabric covering 10, as indicated in section in Fig. 3.

Through the central part of the hose, or that part of the hose which reaches the ground in use a rubber covering 11 is arranged around the fabric 10. This leaves the ends of the hose with full flexibility and the rubber armor around the central portion readily resists the abrasive action as the hose is dragged along the pavement, or ground in its ordinary use.

What I claim as new is:—

1. In an automobile filling stand connection, a filling stand having an elevated hose connection; and a filling hose extending from said connection, said hose having a textile fabric exterior wall at one end, and a rubber armored exterior wall in an intermediate portion of the hose adapted to resist abrasive effect on the portion of the hose reaching the ground in use.

2. In an automobile filling stand connection, a filling stand having an elevated hose connection; and a filling hose extending from said connection, said hose having a textile fabric exterior wall at both ends, and a rubber armored exterior wall in an intermediate portion of the hose adapted to resist abrasive effect on the portion of the hose reaching the ground in use.

In testimony whereof I have hereunto set my hand.

NELSON A. CARLSON.